Oct. 21, 1930.  A. LINDNER  1,778,804
CARTON SEALING MACHINE
Filed Feb. 28, 1928  7 Sheets-Sheet 2
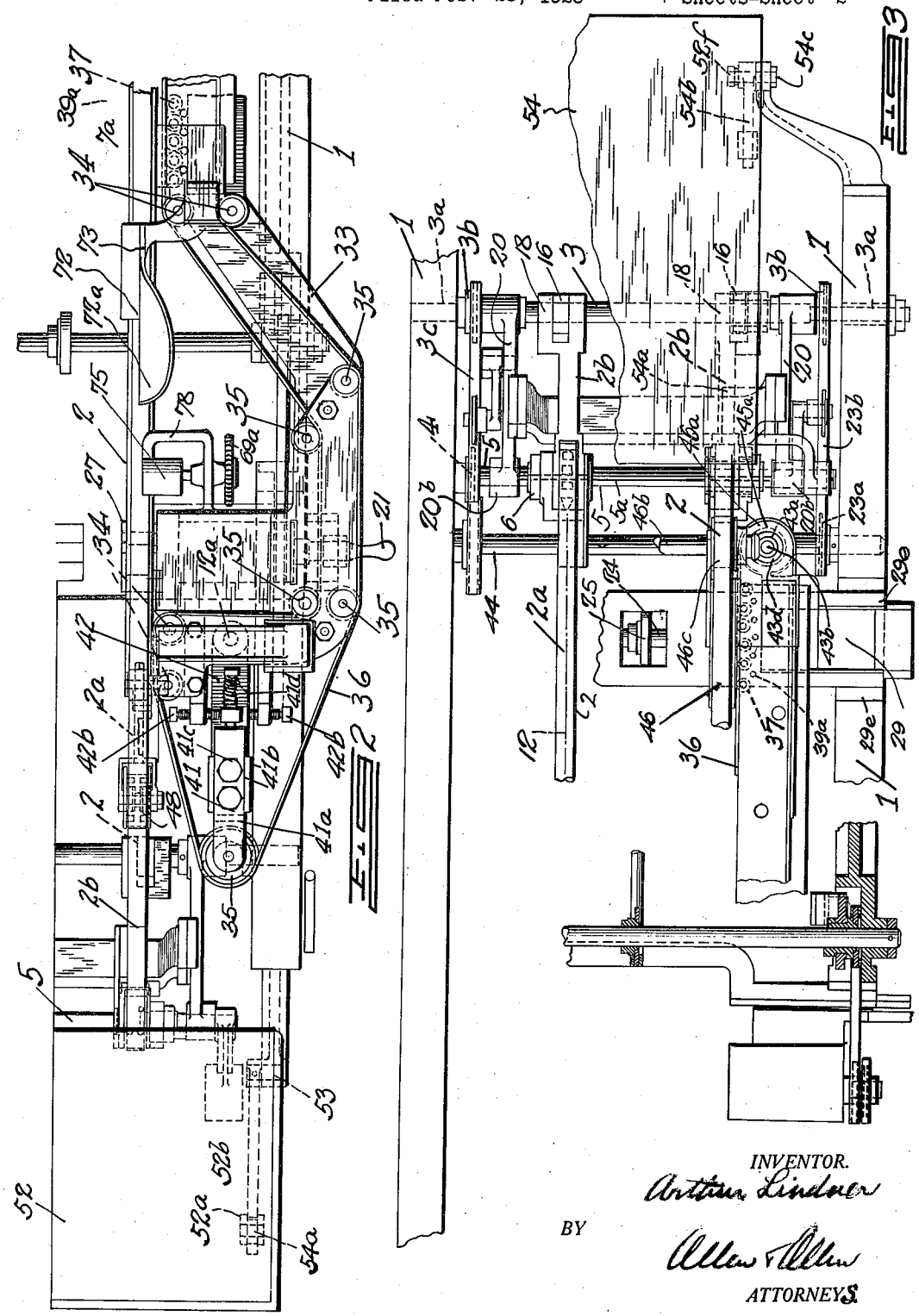
INVENTOR.
Arthur Lindner
BY
Allen & Allen
ATTORNEYS

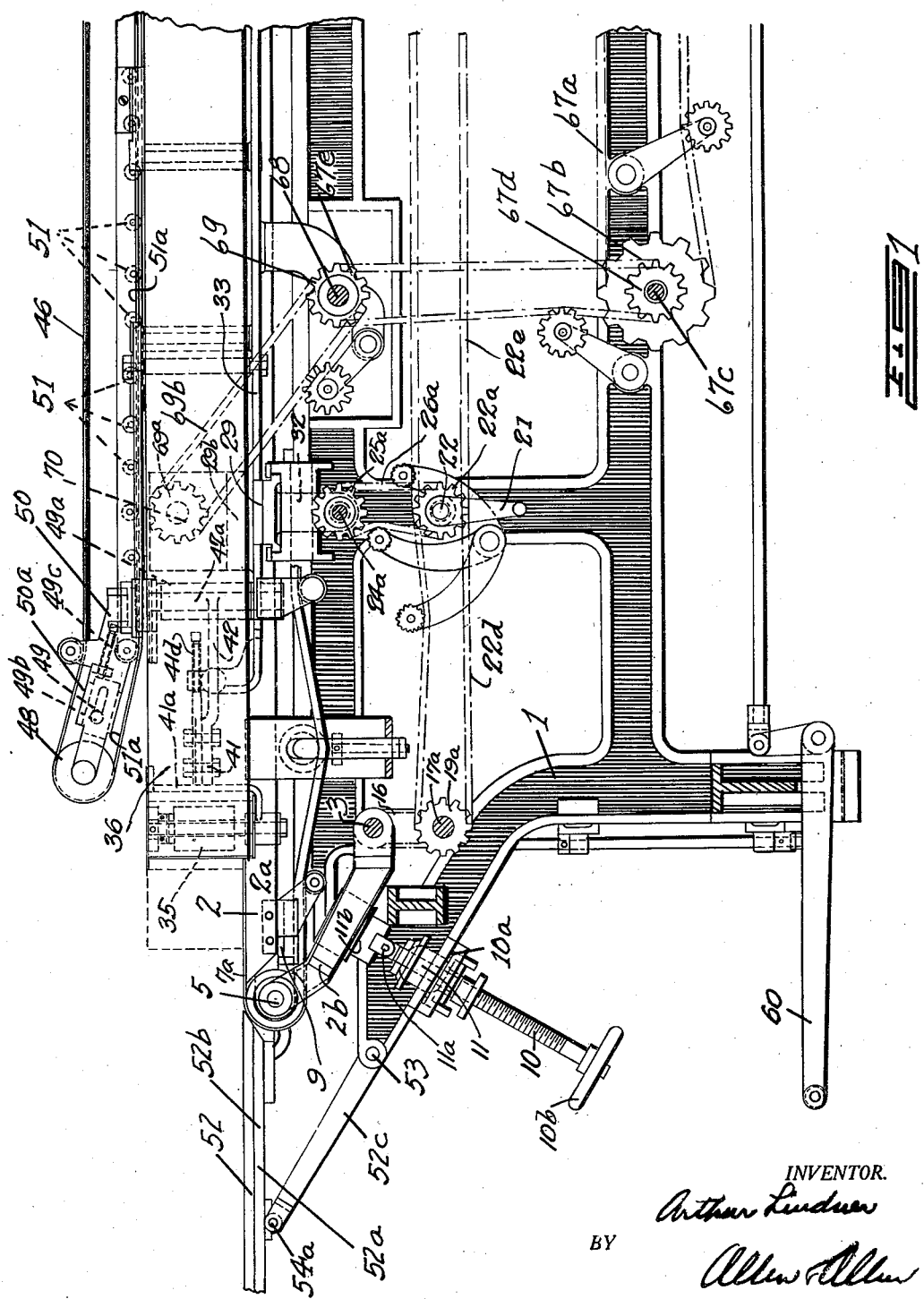

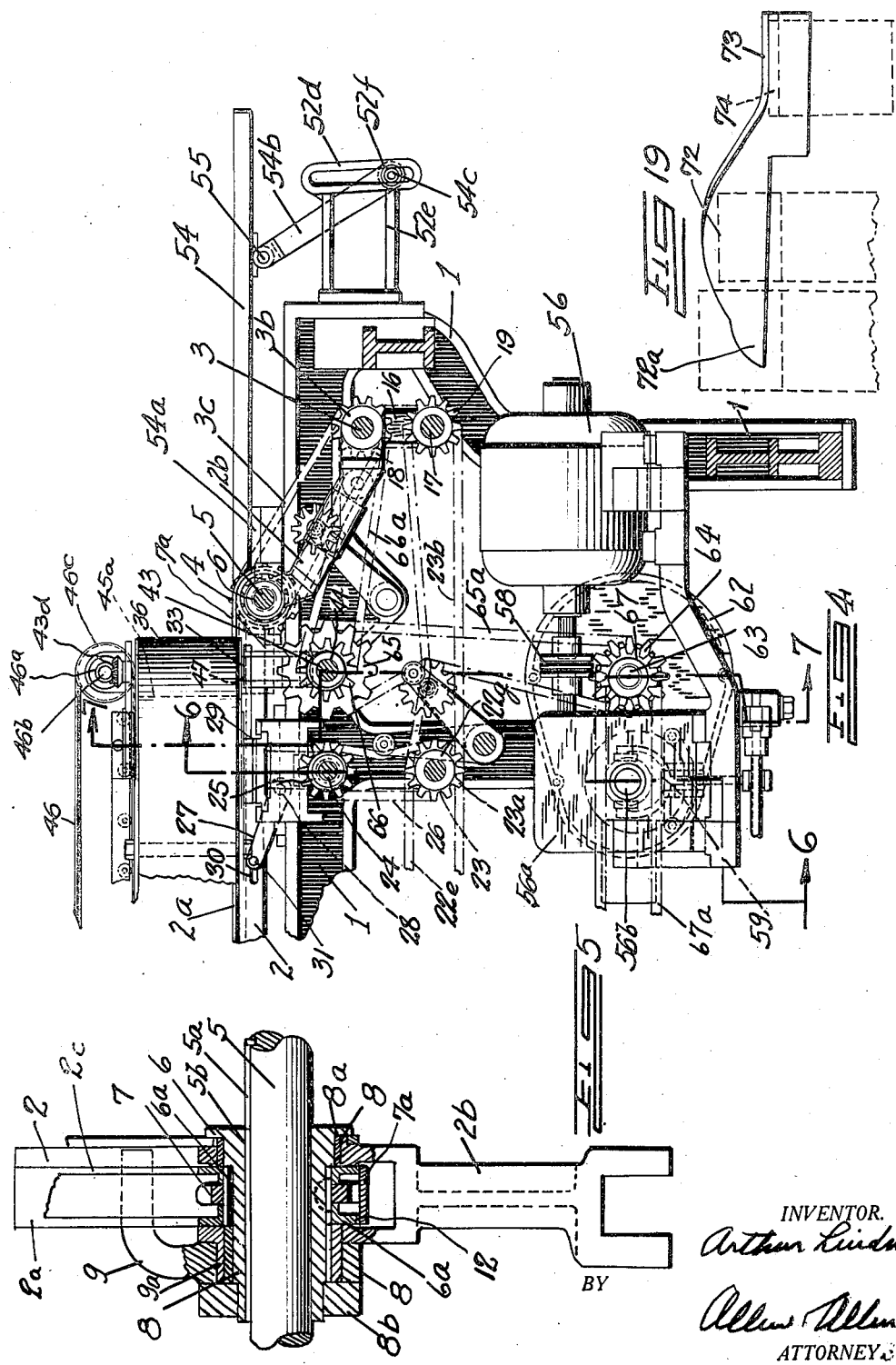

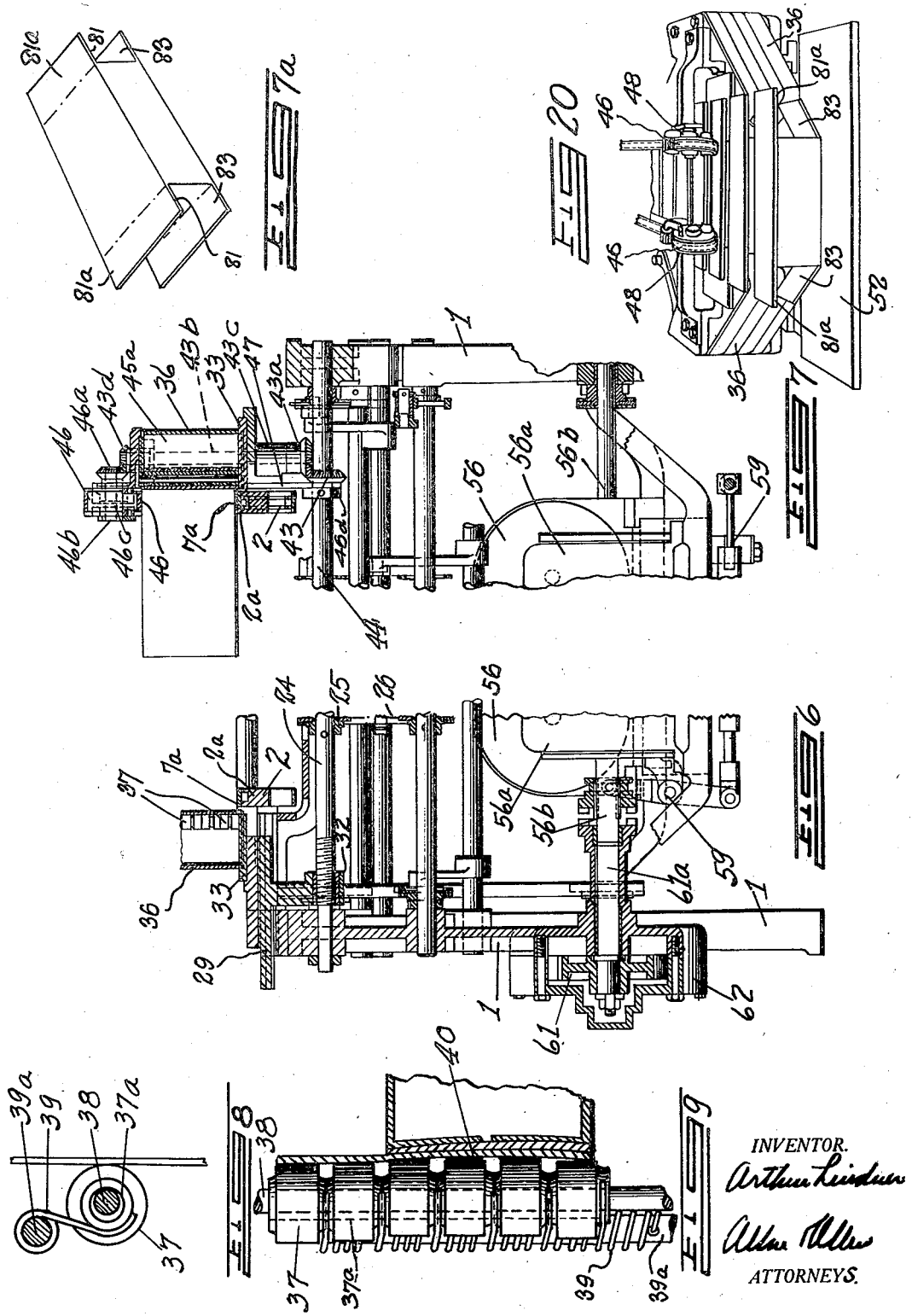

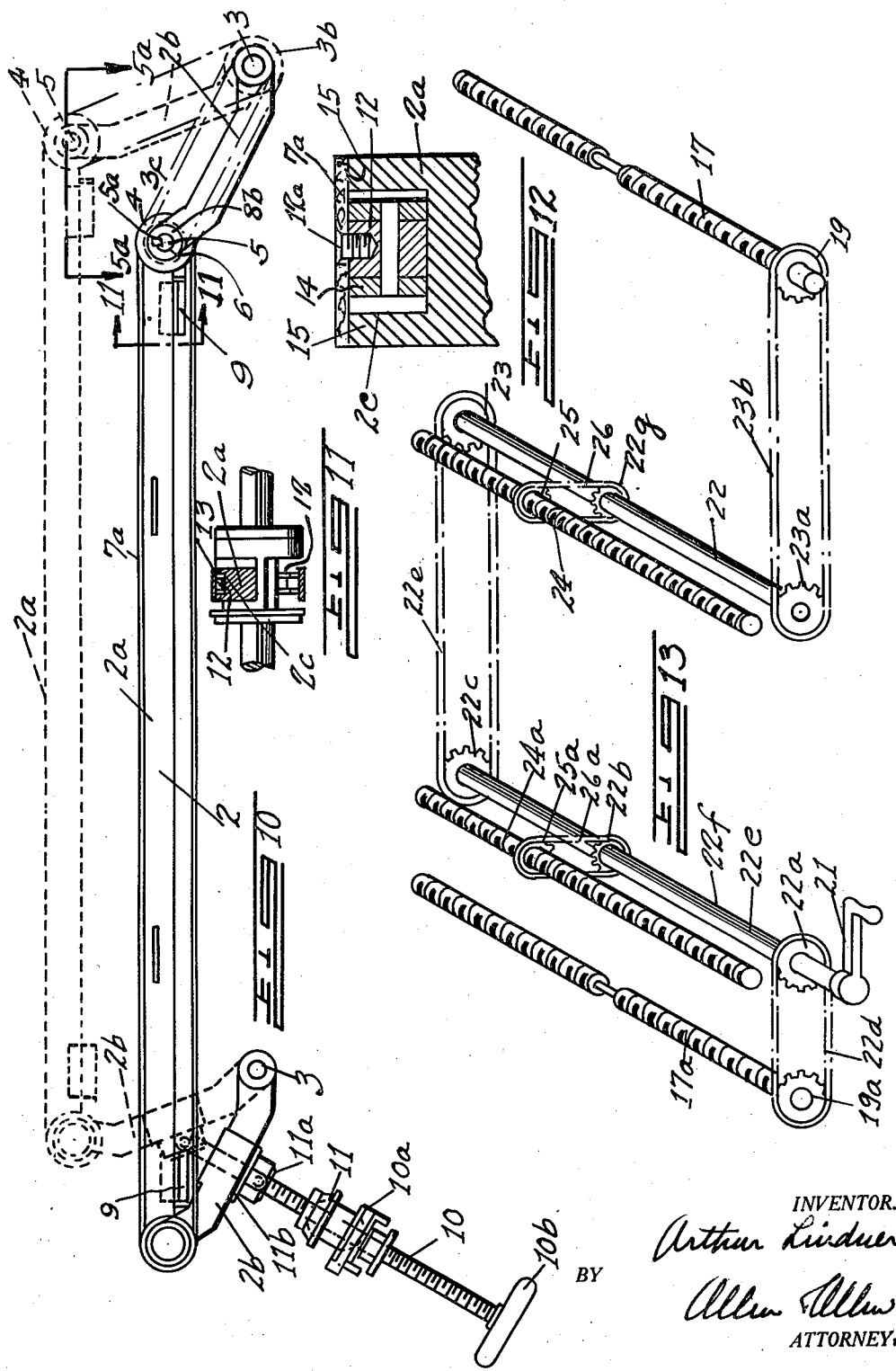

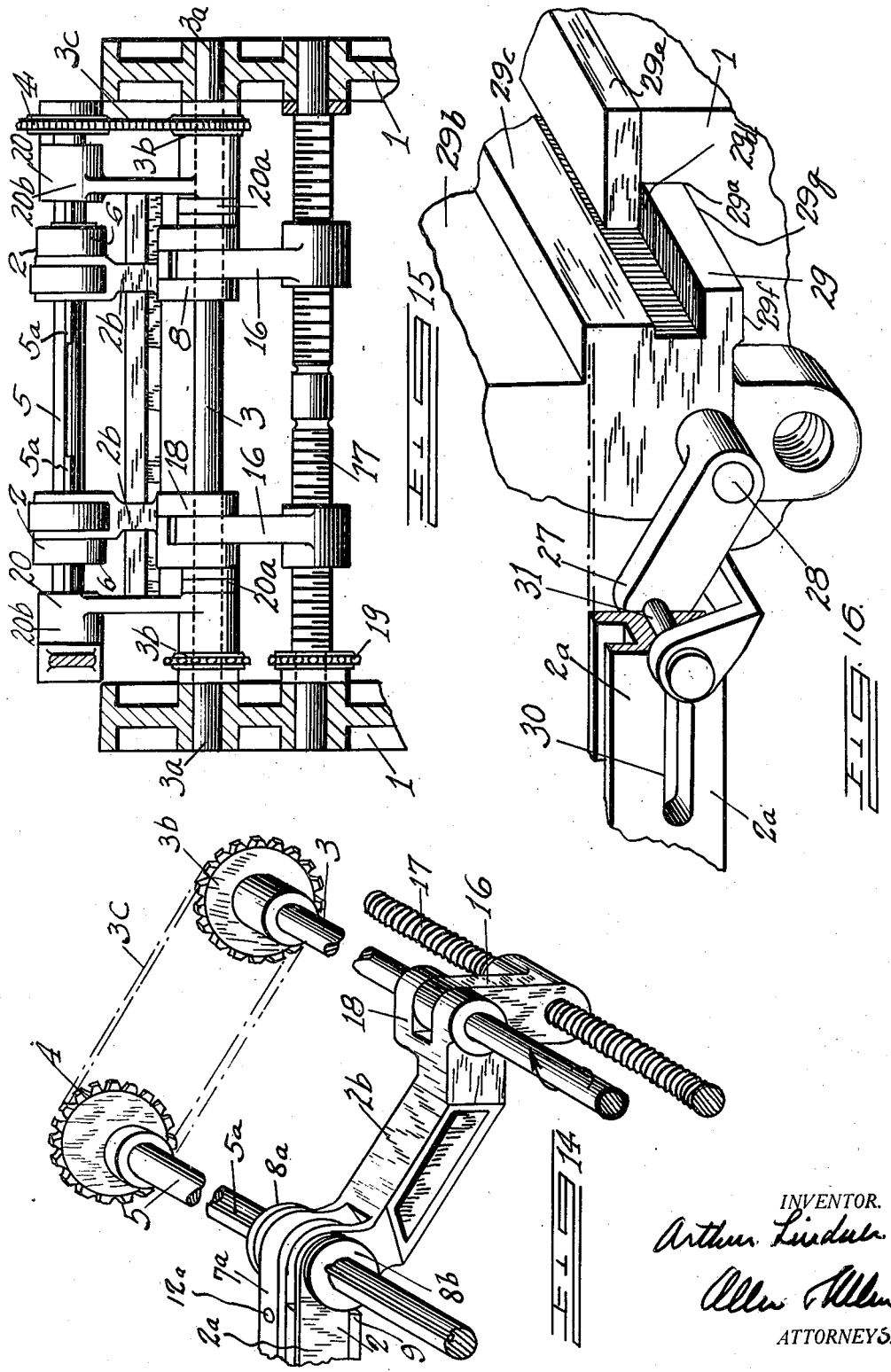

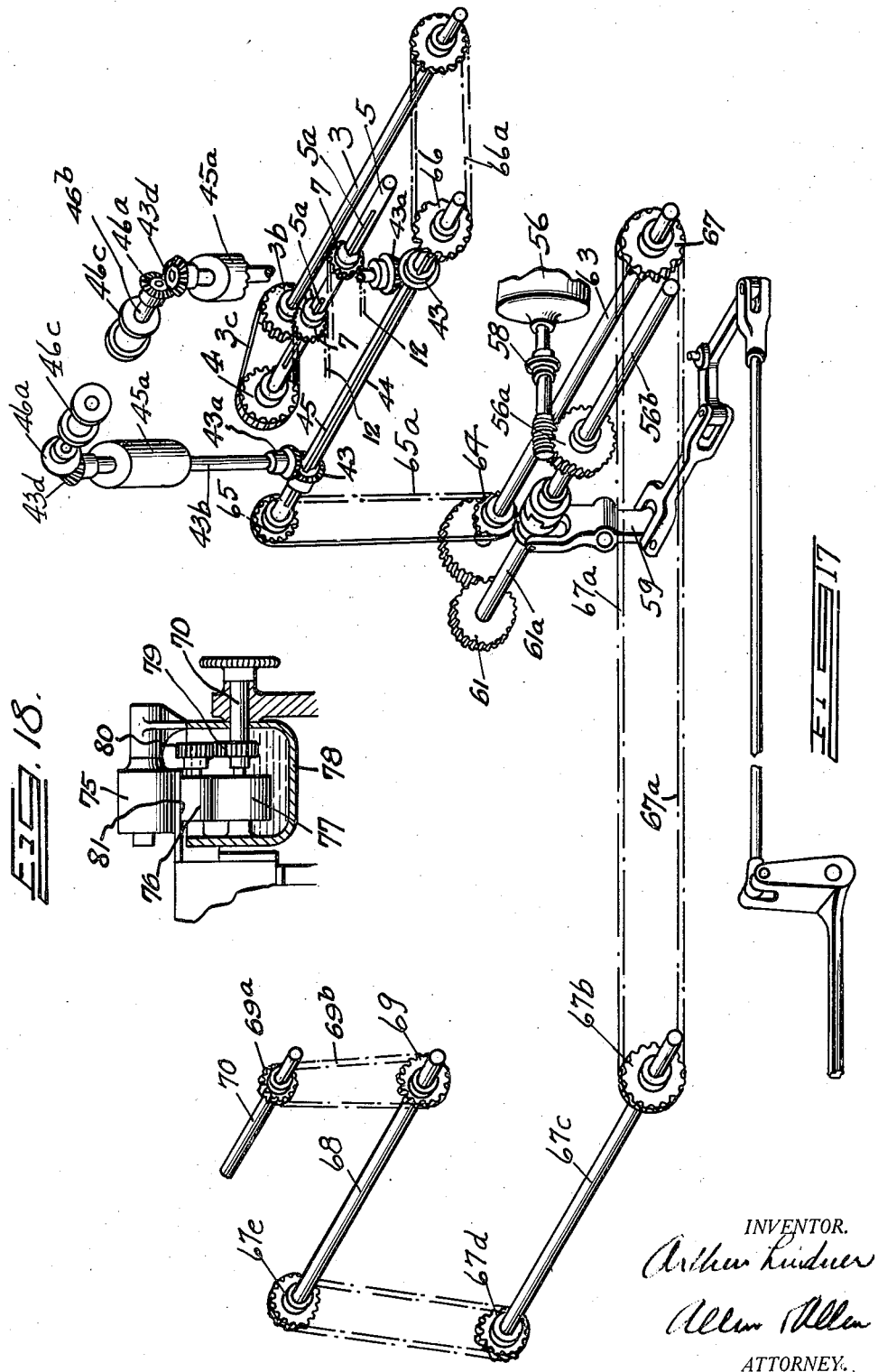

Patented Oct. 21, 1930

1,778,804

UNITED STATES PATENT OFFICE

ARTHUR LINDNER, OF MIDDLETOWN, OHIO, ASSIGNOR TO THE LINDNER MANUFACTURING COMPANY, OF LOCKLAND, OHIO, A CORPORATION OF OHIO

CARTON-SEALING MACHINE

Application filed February 28, 1928. Serial No. 257,749.

My invention relates to carton sealing devices and machines in which closing flaps are glued and sealed during passage through the machines.

Machines of similar type now in use are substantially limited to certain sizes of cartons and boxes and the change from one size to another requires considerable time and labor. In the majority of cases machines of this type are limited to one size carton. This entails considerable investment and other costs involved in the process of sealing boxes and cartons of different sizes.

Broadly it is the object of my invention to provide a sealing machine which will be adjustable to a wide range in sizes of cartons and boxes. It is my object to provide a machine in which adjustments for cartons of varying size can be made in a very simple manner as I provide one control unit which adjusts the machine for one dimension of the carton, and another control unit which adjusts the machine for the other dimension.

It is the object of my invention to provide a machine in which there are a pair of spaced conveyor belts which remain in a fixed plane regardless of the lateral adjustment or interspacing between them, and in which a conveyor belt is independently adjustable to and from the plane of the spaced belts. It is further my object to provide pressure belts for the walls of the carton at right angles to the walls which the conveyor belts engage, and for these pressure belts it is my object to provide a unit control which will independently adjust the machine for this dimension of the carton.

It is my object to provide pressure belts which are fixed in the direction of the width of the pressure belts but which are adjustable in the plane of the conveyor.

If the carton is conveyed flatwise through the machine by contact with the conveyor belts adjustment for this dimension may be taken care of by one control unit whereas the lengthwise or widthwise adjustment will be controlled independently by another control unit.

Since the flaps being sealed may not lie in a flat plane all of the way across and since parts might be out of contact with the pressure belts it is my object to provide self adjusting rollers bearing against the belts which are automatically forced by springs to adjust themselves to the shape of the carton or box during the pressure applying operation which results in uniform pressure being applied over the entire flap portion of the carton being sealed.

The above and other objects to which references will be made in the following disclosure I accomplish by that certain combination and arrangement of parts of which I have illustrated a preferred embodiment.

In the drawings:

Figure 1 is a side elevation in part of the feed end with the rear side frame removed.

Figure 2 is a plan view showing one-half of the feed end.

Figure 3 is a plan view showing in parts the glue box drive, vertical and top pressure belts and the drive and supports for the grooved guides forming the four bar chain construction.

Figure 4 is a side elevation in part of the discharge end with the rear side frame removed showing the power drive, end table and vertical and horizontal belts along with the cross slide.

Figure 5 is a section through the bearing for the bottom pressure belt drive taken on line 5ᵃ—5ᵃ of Figure 10.

Figure 6 is a sectional elevation on the line 6—6 of Figure 4.

Figure 7 is a sectional elevation on the line 7—7 of Figure 4.

Figure 7ᵃ is a perspective of a carton with flaps open.

Figure 8 is a top plan view of compression rollers and springs.

Figure 9 is an end elevation of the compression rollers with the belt shown in section.

Figure 10 is a side elevation of the adjusting screw and four bar chain mechanism including the bottom pressure belt.

Figure 11 is a section of the grooved guide and support taken on line 11—11 of Figure 10.

Figure 12 is an enlarged sectional view of the grooved guide showing the method of mounting the bottom pressure belt.

Figure 13 is a diagrammatic view of the adjusting screw shafts and means for driving same.

Figure 14 is a perspective view of the adjusting screw four bar chain arm which supports the grooved guides showing also the method of driving the bottom pressure belt.

Figure 15 is an end elevation showing the position of the adjusting screw four bar chain arms and the drive for the bottom pressure belts.

Figure 16 is a perspective view of the pushing member mounted on the cross slide and slidably retained in the grooved guide for bottom pressure belt.

Figure 17 is a diagrammatic view of the power drive.

Figure 18 is a section through the glue pot showing a carton flap in place.

Figure 19 is a detail of the flap turn over plate with successive positions of a carton shown in dotted lines.

Figure 20 is a perspective showing part of the feed end with cartons entering the machine.

I have shown the main side frame standards 1 upon which all the component parts of the machine are supported.

A four bar chain frame 2, shown separately in Figure 10, comprises the grooved guide 2$^a$ and the short supporting arms 2$^b$ rotatively mounted on the jack shafts 3 which in turn are rotatably mounted in the bearings 3$^a$ in the main side frames. These shafts 3 are for supporting the arms which maintain the position of a bottom conveyor belt. This shaft has mounted thereon the sprocket 3$^b$ which drives the sprockets 4 mounted on the bottom conveyor belt drive shaft 5 through the chain 3$^c$.

Figure 5 shows the bottom conveyor belt drive-shaft which has the key 5$^a$ inserted therein for a considerable portion of its length. This permits the four bar chain frames to slide toward or away from each other and still maintain a positive driving connection with the drive shaft 5. The key 5$^a$ fits in the slot 5$^b$ of the bushing 6 which rotates with the shaft 5 and is free to slide longitudinally thereon. The sprocket 7 which drives the bottom or adjustable conveyor belt 7$^a$ is keyed to the bushing 6 by means of the key 6$^a$ thereby causing the sprocket, the bushing and the shaft 5 to rotate as a single unit. The bushing is rotatively mounted in the arm 2$^b$ at 8 and confined therein by the shoulder 8$^a$ and the collar 8$^b$. The purpose of mounting the bushing 6 rotatively in the arm 2$^b$ is to provide a hinged joint in the four bar chain frame and permit the grooved guide frame 2$^a$ to be raised or lowered during an adjusting operation. The grooved guides are supported on two similar brackets 9 on each side of the machine which are rotatively mounted on the surfaces 9$^a$ of the arms 2$^b$ and held from lateral motion with respect to the arms 2$^b$ by means of the collars 8$^b$. These brackets are fastened to the guides and are the connecting and bearing means between the grooved guides. The arms 2$^b$ and grooved guide form links in the four bar chain frame. The adjustable conveyor belts are driven only at the discharge end. These belts are adjustable in the horizontal and vertical planes. The construction of the feed end is alike in every respect excepting that the shaft has no key thereby permitting the sprocket to idle thereon between its confining members.

At the feed end I have provided the jack screw 10 which extends through a bracket 10$^a$. By turning the screw hand wheel 10$^b$ the jack screw advances upward or downward and pushes the arm 2$^b$ upwardly or downwardly, and causes it to rotate about the supporting shaft 3. I have also provided a ball and socket joint 11 and a swivel connection 11$^a$ which compensate for the varying angularity of the arm 2$^b$ with relation to the fixed line of travel of the jack screw while the grooved guides and hence the adjustable conveyor belts are being raised or lowered into position to accommodate the size of the carton to be sealed. The arms 2$^b$ are supported by the cross-arm 11$^b$ and the screw 10 is connected in the center of the cross arm as shown.

Referring to Figure 10 the dotted lines indicate an elevated position of the adjustable conveyor belt by means of the four bar chain frame.

The chains 12, carrying the adjustable conveyor belts 7$^a$ are driven by the sprockets 4 and ride in the grooves 2$^c$ in the grooved guides. The chains are composed of solid links in which threads are tapped to receive the flat headed screws or rivets 12$^a$ and the adjustable conveyor belts at certain intervals are fastened by the members 14 so as not to interfere with the free turning of the chains over the sprockets. The belts ride on the top surface 15 of the sides of the grooved guides which provide a solid base during the travel of the cartons through the machine.

A link 16 is mounted on the four bar chain adjusting screw 17 and the link slidably engages the shaft 3 which is slidably engaged in the bifurcated end 18 of the arm member 2$^b$. when the links 16 are moved horizontally by the screw they in turn move the arm members 2$^b$ with them. The screw 17 has right and left threads so that it will move the links 16 simultaneously either toward or away from each other, and the four bar chain frames will also move through the arms 2$^b$ which are part of the four bar chain frames in the same manner.

There are two screws journaled and rotatively mounted one at each end of the machine in the frames and they are moved in a like amount by means of the sprockets 19 through a system of chains and sprockets described. These screws are moved only during an adjusting operation. In order to keep the four bar chain frames in parallel position I have provided another set of supporting arms 20 which are rotatively mounted on the shaft 3 and held from lateral sliding motion by the collars 20$^a$ and the sprockets 3$^b$. These arms 20 engage the shaft 5 which is rotatable in the bearings 20$^b$. During operation of the machine the shaft 3 rotates in the bearings of the arms and in other members supported on it.

Referring to Figure 13 by turning the crank 21 mounted on the shaft 22 on its outer end, outside of the frame of my machine, I cause all adjusting screws to move simultaneously. The sprocket 22$^a$ connects with the sprocket 19$^a$ through the chain 22$^d$ which causes the screw 17$^a$ at the feed end to revolve. Simultaneously the screw 17 is caused to revolve by the sprocket 22$^c$ through the chain 22$^e$, the sprockets 23 and 23$^a$ and the chain 23$^b$. Since the screws 17 and 17$^a$ have alternate right and left threads it is apparent that they will cause the four bar chain frames to come together or more apart according to the direction of rotation of the crank handle. At the same time that the four bar chain fraces are moving the cross slides which will be hereinafter described, are caused to move by the screws 24 and 24$^a$. These screws are rotated by the sprockets 25 and 25$^a$ connecting to the sprockets 22$^b$ and 22$^g$ by the chains 26 and 26$^a$ which are also mounted on the shafts 22 and 22$^f$ which are being rotated by means of the crank handle. As hereinbefore mentioned the screws are rotatively mounted in a fixed position in the frame with relation to the parts they move.

In order to assist the movement of the four bar chain frames I have provided the pivotally mounted lever 27 on the stud 28 fixed in the cross-slide 29. The other end of the lever 27 straddles the grooved guides in such a manner as not to interfere with the travel of the adjustable conveyor belt. In addition to the foregoing, as shown in Figure 16, I have provided a slot 30 which connects the grooved guide to the lever by means of the pin 31 in the lever. The slots in the grooved guides permit them to move up without disengaging the levers. When the cross-slide moves in either direction it will move the lever also which in turn will move the grooved guides and assist their movement which is primarily accomplished through the arms 2$^b$ at their ends.

The cross slides consist of a main body portion 29$^b$ upon which are mounted bases 33 which support the vertical pressure belts and their appurtenances. The lower portion 29$^c$ is wider than the upper so as to provide grooves 29$^d$ for the plates 29$^e$, fastened to the main frame of the machine, which guide and leave the cross slides free to slide in a lateral direction. These slides have machined surfaces 29$^f$ that slide over supporting surfaces 29$^g$ on the main frame when they are moved by their respective adjusting screws.

The cross-slides are adjustable in ways 29$^a$ provided in the sides frames of the machine. Extending from the bottom of the cross slides and fastened thereto are brackets having internally threaded bosses 32 into which the adjusting screws 24 and 24$^a$ are screwed. When these screws are rotated in the bosses they cause the cross-slides to move simultaneously.

There are four cross-slides which move simultaneously and on each one I support the bases 33 which in turn support vertical pressure belts for sealing the carton flaps and a top conveyor belt in co-operation with which the adjustable conveyor belt accommodates the machine for the particular size of carton being sealed.

The two pressure belts 36, one on each side of the machine, are of the endless type and pass about the idler pulleys 34 which guide the belts so that the flaps of a carton will be firmly pressed down against the carton during the passage through the machine. These belts are held in a fixed horizontal plane with relation to the top conveyor belts but are adjustable laterally with relation to the horizontal longitudinal axis of the machine.

Other idler pulleys 35 are set back from the line of travel of the box or carton to be sealed and bring the belts 36 back far enough to provide space for a gluing pot and flat turn over plates, which may be of any preferred construction.

In addition to the idler pulleys 34 and 35 I have also provided a train of multiple pressure rollers 37 which are shown on an enlarged scale in Figure 9. These rollers 37 are mounted on shafts 38 which are of smaller diameter than holes 37$^a$ in the rollers. The enlarged holes in the rollers permit the springs 39 mounted on the studs 39$^a$ on the base 33 to press the rollers against the pressure belts. A carton is always most resistant to pressure at its corner edges and although a fixed pressure belt will press sealing flaps firmly against the corners it becomes a problem to press flaps to be sealed firmly against the carton walls along the area between the corner edges. These rollers acting on the belt in the manner described insure pressure over the entire area of the flaps being sealed. Each spring acts separately on its individual roller and can thereby fix the rollers and belts to the contour of the ends of the boxes being sealed. This contour obviously can be either concave or convex depending upon conditions of the container and its contents. In Figure 9 we have indicated a concave contour with the pressure belt being pressed evenly against the entire surface of the carton.

In order to adjust the pressure belts I have provided an adjustable belt tightener 41 at the feed end of the machine. The pulley supporting arm 41$^a$ is slidably mounted between the guides 41$^b$ of the bracket to be described and can be moved in a longitudinal direction when the clamp bolts 41$^c$ are loosened. In order to insure keeping the supporting arms in their set positions I have provided stop studs 41$^d$ which bear against the back faces of the supporting arms and prevent any tendency of the pressure belts pulling the arms back from the desired set positions. Pulleys 35 are supported on brackets 42 pivoted on studs 42$^a$ mounted on members extending from the cross slides. The brackets 42 are limited in motion and held in place by the stop screws 42$^b$ which are screwed in the members extending from the cross slides. From the foregoing it will be noted that by loosening all of the stop screws the pulleys can be moved longitudinally and laterally. Moving the pulleys in this manner results in a similar movement of the belts.

The vertical and horizontal belts are driven at the discharge end through a system of bevel gears. Bevel gears 43 are slidably mounted on a shaft 44 which drives them by means of a key 45. These gears 43 are rotatively supported in bearings 46$^d$ of a bracket 47 fixedly mounted on the bases which support the vertical belts and their other component parts. The gears 43 in turn mesh with other gears 43$^a$ pinned to the shafts 43$^b$ which are rotatively mounted in the fixed bearings 43$^c$ on the bases. These shafts 43$^b$ are keyed to vertical pulleys 45$^a$ which drive the pressure belts 36 and which also drive the fixed conveyor belt 46 by means of bevel gears 43$^d$ mounted on the upper ends of the shafts.

The bevel gears 43$^d$ mesh with the bevel gears 46$^a$ keyed to the shafts 46$^b$ to which are also keyed the driving pulleys 46$^c$ for the fixed conveyor belts. The pulleys 46$^c$ are of sheaved type so as to keep the top pressure belts in line and prevent them from slipping off the pulleys.

By slidably mounting the bevel gears 43 on the splined shaft 44 I am able to maintain a positive driving connection from the power source to the pressure belts and the top conveyor belts even though I vary the position of the pressure belts by adjusting them to the desired sizes of cartons or boxes to be sealed.

The idler pulleys 48 for the top conveyor belts at the feed end are supported in adjustable brackets 49 which are mounted on a pedestal 49$^a$ extending up from the base supporting the vertical belts. By loosening the cap screws 49$^b$, the arms 49 are free to move when the stop screws 49$^c$ are screwed against their back sides. The arms are confined to an upward inclined movement by the side guides 50$^a$ of the extending bracket 50 supported on the pedestal. Causing the pulleys to move outward results in tightening of the top conveyor belts.

Since the belts are flexible and will bend away from a carton I have provided a plurality of pressure rollers 51 which bear against the inside 51$^a$ of the upper belts and hold them in contact with the carton being sealed and thereby maintaining sufficient friction on the carton or box to carry the cartons through the machine.

The feed-in table 52 maintains a level position with the bottom conveyor belts at all times. This table is supported on the collapsible triangular frame 52$^a$ composed of the links 52$^b$ which are rotatively supported on the shaft 5 and the links 52$^c$ are also rotatively mounted on the stud 53 mounted in the main frame. The links are hinged to the table as indicated at 54$^a$. The construction indicated is a four bar chain movement consisting of the two links, the arms 2$^b$ and the main frame. Figure 1 illustrates clearly how the table will maintain a horizontal position to all horizontal positions of the bottom conveyor belts and their guides.

The table 54 at the discharge end (see Figure 3) is also composed of a collapsible frame but it is free to be adjusted to any desired angle for discharging the sealed cartons coming from the machine. This table is supported by the brackets 54$^a$ which are rotatively mounted on the shaft 5. On its outer end the table is supported by the swinging link 54$^b$ through the stud 54$^c$ which in turn is confined to set positions in the slots 52$^d$ of the brackets 52$^e$ (see Figure 4) by the lock nuts 52$^f$. The stud 55 completes a hinged joint between the table and swinging link. From the above description it can be seen that the table can be set to any desired angle within the limits controlled by the slot.

The power for driving the pressure belts is derived from the motor 56 which is directly connected to the reduction gear 56$^a$ unit by a coupling 58. A clutch mechanism 59 operated by means of a foot lever 60 is placed between the reduction gear unit and the change gear train 61 in its housing 62. The clutch may be of toothed type as indicated one-half being keyed fast to the reduction gear shaft 56$^b$ and its other half keyed slidably to the shaft 61$^a$ to which is fastened one of the change gears. The clutch eliminates the necessity of stopping the motor each time it is necessary to stop the belts.

The clutch drives the shaft 61$^a$ which is rotatively mounted in the main frame. The shaft 61$^a$ drives the change gears which drive the shaft 63 rotatively mounted in the bearings in the main frame. On the shaft 63 is mounted the sprocket 64 which by means of the chain 65$^a$ drives the sprocket 65 mounted on the shaft 44. On the shaft 44 I have mounted another sprocket 66 which drives the sprocket 3ᵇ on the shaft 3 by means of the chain 66ᵃ. The last mentioned sprocket drives the bottom conveyor belt as has been previously described.

The other sprocket 67 drives the glue pot rolls through the chain 67ᵃ extending towards the feed end of the machine where it drives a sprocket 67ᵇ which is keyed on a shaft 67ᶜ. The shaft 67ᶜ has a secondary sprocket 67ᵈ which drives a sprocket 67ᵉ on the shaft 68. A sprocket 69 mounted on the shaft 68 drives the glue pot roll driving sprocket 69ᵃ on the shaft 70 through the chain 69ᵇ. In all cases I have provided idler tension sprockets to take up the slack in the chains.

The cartons or boxes are fed into the machine in the manner illustrated in Figures 7ᵃ and 20. The top and bottom conveyor belts convey them while the flaps are being glued by the glue rolls, and while the flaps are being turned down by the flap turn down plates 71. The flap turn down plates are similar to the one well known in the art of paper sealing machines. They consist of a rectangular twisted member whose ends 72ᵃ are horizontal and gradually turn or twist until the other end 73 is in a vertical position. The carton flaps shown in dotted lines enter and come into contact after being glued, with the end 72ᵃ, and gradually move along the surface 72 until the flaps are turned down against the box as shown at 74. The glue rolls are also well known in the art and consist of a top pressure roll 75 which holds the part of the flap to be glued against a roller 76 which receives the glue from a spreading roller 77. This last roller is running continuously in glue held in the container 78 which is fixedly mounted on the frame of the machine. The spreading roller is mounted on the drive shaft 70 which also has a gear 79 keyed on it. This gear meshes with another gear 80 and drives the glue rolls which deposit an even thickness of glue on the under side 81 of the flap. The cartons 82 are fed into the machine with the inner flap 83 folded back in glued position. The upper flap 81ᵃ rides over the top edge of the pressure belts 36 until it passes between the glue rolls. After leaving the glue rolls it comes in contact with the flap turn down plate which turns the flap 81ᵃ down so that it comes in contact and adheres to the flap 83. When the flaps are sealed down they are conveyed to the position in which they are engaged between the pressure belts and the belts which apply pressure to the sealed flaps until the cartons are discharged from the machine.

Having thus described my invention what I claim as new and desire to secure by Letters Patent is:

1. A carton sealing machine having adjustable top conveying belts operable in a fixed horizontal plane and adjustable in vertical planes, bottom conveying belts operable and adjustable in different vertical and horizontal planes, side pressure belts operable in a fixed horizontal plane and adjustable in different vertical planes relative to said top and bottom conveying belts, means for guiding top edges of said vertical pressure belts relative to said top conveying belts, and means to adjust all of said belts simultaneously.

2. A carton sealing machine having a support for one wall of a carton, and a conveying belt mounted so as to be operable in a plane spaced from and parallel to the plane of said support, pressure belts adjustable to compensate for various dimensions of carton walls substantially at right angles to said support, means for adjusting said pressure belts, and a unitary control for said means.

3. A carton sealing machine having a support for one wall of a carton, and a conveying belt mounted so as to be operable in a plane spaced from and parellel to the plane of said support, pressure belts adjustable to compensate for various dimensions of carton walls substantially at right angles to said support, means for adjusting said pressure belts, and a unitary control for said means, and a unitary control for adjusting the spaced position of said first named conveying belt.

4. A carton sealing machine having a pair of pressure conveying belts mounted in parallel planes spaced one from the other so as to support opposed walls of a rectangular carton, and pressure belts mounted in parallel planes so as to support walls of the carton connecting said opposed walls and a unit control for adjusting the spaced position of said first named pair of belts.

5. A carton sealing machine having a pair of conveying belts mounted in parallel planes spaced one from the other so as to support opposed walls of a rectangular carton and spaced pressure belts adjustably mounted in parallel planes so as to support walls of the carton connecting said opposed walls, and a unitary control for the adjustment of said pressure belts.

6. A carton sealing machine having a pair of pressure conveying belts mounted in parallel planes spaced one from the other so as to support opposed walls of a rectangular carton, and pressure belts mounted in parallel planes so as to support walls of the carton connecting said opposed walls and a unit control for adjusting the spaced position of said first named pair of belts, said pressure belts being adjustable for different sized cartons and a unit control therefor.

7. A carton sealing machine having a pair of conveying belts mounted in parallel planes spaced one from the other so as to support opposed walls of a rectangular carton and spaced pressure belts adjustably mounted in parallel planes so as to support walls of the carton connecting said opposed walls and auxiliary pressure means adopted to conform to the shape of a carton under pressure, said means being mounted in the plane of said pressure belts.

8. In a carton sealing machine adjustable for various sized cartons an upper conveying belt operable in a fixed plane, and a spaced adjustable lower belt with means for adjusting the position of said lower belt and adjustable side conveying belts for engaging walls of a carton at right angles to the opposed walls of a carton engaged between said upper and lower belts.

9. In a carton sealing machine adjustable for various sized cartons an upper conveying belt operable in a fixed plane, and a spaced adjustable lower belt with means for adjusting the position of said lower belt and adjustable side conveying belts for engaging walls of a carton at right angles to the opposed walls of a carton engaged between said upper and lower belts and a unit control for controlling the position of said side conveying belts.

10. In a carton sealing machine adjustable for various sized cartons an upper conveying belt operable in a fixed plane, and a spaced adjustable lower belt with means for adjusting the position of said lower belt and adjustable side conveying belts for engaging walls of a carton at right angles to the opposed walls of a carton engaged between said upper and lower belts and auxiliary pressure rolls provided with means for mounting same so as to compensate for distorted contours of cartons passing through said machine.

11. In a carton sealing machine having conveying belt pressure rolls provided with means for mounting same so as to allow uniform pressure against irregular walls of cartons by the tension of said conveying belts, said mounting means comprising a series of apertured rollers with axles therefore of less diameter than the apertures therein, and resilient means for holding said rollers in tensioned position.

12. In a carton sealing machine having conveying belt pressure rolls provided with means for mounting same so as to allow uniform pressure against walls of cartons distorted by the tension of said conveying belts, said mounting means comprising a series of apertured rollers with axles therefore of less diameter than the apertures therein, and resilient means for holding said rollers in tensioned position, said rollers having hubs of reduced size and said resilient means comprising springs bearing against said hubs.

13. In a carton sealing machine adjustable for various sized cartons upper conveying belts operable in a fixed plane, and spaced adjustable lower belts with means for adjusting the position of said lower belts and a feed in table at the receiving end of the machine provided with means for moving said table in parallel alignment with said lower belts.

14. In a carton sealing machine adjustable for various sized cartons upper conveying belts operable in a fixed plane, and spaced adjustable lower belts with means for adjusting the position of said lower belts and a feed in table at the receiving end of the machine provided with means for moving said table in parallel alignment with said lower belts and a discharge table provided with an independent adjustment for controlling the angle of inclination thereof.

15. In a machine for sealing cartons vertical and horizontal top and bottom conveyors and pressure means, flap closing mechanism, means for laterally adjusting said vertical and horizontal top and bottom pressure means, and means for vertically adjusting said bottom pressure means independent of the said top pressure means.

16. In a carton sealing machine adjustable for various sized cartons upper conveying belts operable in a fixed plane with lateral adjustment, and spaced adjustable lower belts with means for adjusting the position of said lower belts and a feed in table at the receiving end of the machine provided with means for moving said table in parallel alignment with said lower belts, said laterally adjusting means having a unit control.

17. In a carton sealing machine adjustable for various sized cartons upper conveying belts operable in a fixed plane, vertical conveyors and spaced adjustable lower belts with means for adjusting the position of said lower belts and a feed in table at the receiving end of the machine provided with means for moving said table in parallel alignment with said lower belts, said vertical conveyors having simultaneously adjustable means with a unitary control therefor.

ARTHUR LINDNER.